United States Patent [19]

Bawden et al.

[11] 3,935,832
[45] Feb. 3, 1976

[54] SELF-PROPELLED BOAT VEHICLE

[75] Inventors: Ralph D. Bawden, Billings, Mont.;
Robert Olson, a/k/a John R. Olson, Price, Utah

[73] Assignee: Recreational Plastics, Inc., Billings, Mont.

[22] Filed: July 22, 1974

[21] Appl. No.: 490,714

[52] U.S. Cl.................................. 115/.5 A
[51] Int. Cl.² ............................... B60F 3/00
[58] Field of Search ............. 115/.5 A, 1 R, 34 R

[56] References Cited
UNITED STATES PATENTS

| | | | |
|---|---|---|---|
| 2,652,019 | 9/1953 | Hurst | 115/34 R |
| 3,105,454 | 10/1963 | Baldwin | 115/34 R |
| 3,626,891 | 12/1971 | Sessions | 115/.5 A |
| 3,646,904 | 3/1972 | Lanning et al. | 115/.5 A |
| 3,707,938 | 1/1973 | Olson | 115/1.0 R |

Primary Examiner—Trygve M. Blix
Assistant Examiner—Gregory W. O'Connor
Attorney, Agent, or Firm—David H. Veeder

[57] ABSTRACT

The combination of a snowmobile and a watertight hull with propeller drive shaft wherein the snowmobile has a drive shaft which includes telescopically extensible section on both ends of which universal joints are provided so that the snowmobile drive shaft can be readily disconnected from its traction tread and connected to the propeller drive shaft of said hull.

5 Claims, 6 Drawing Figures

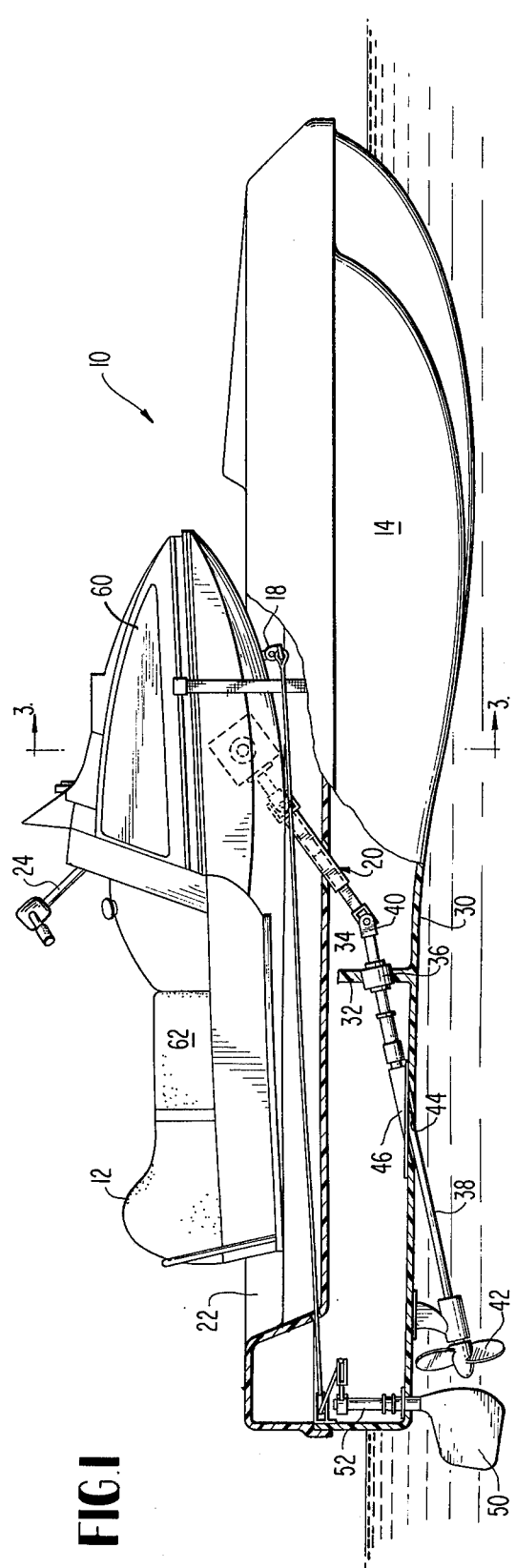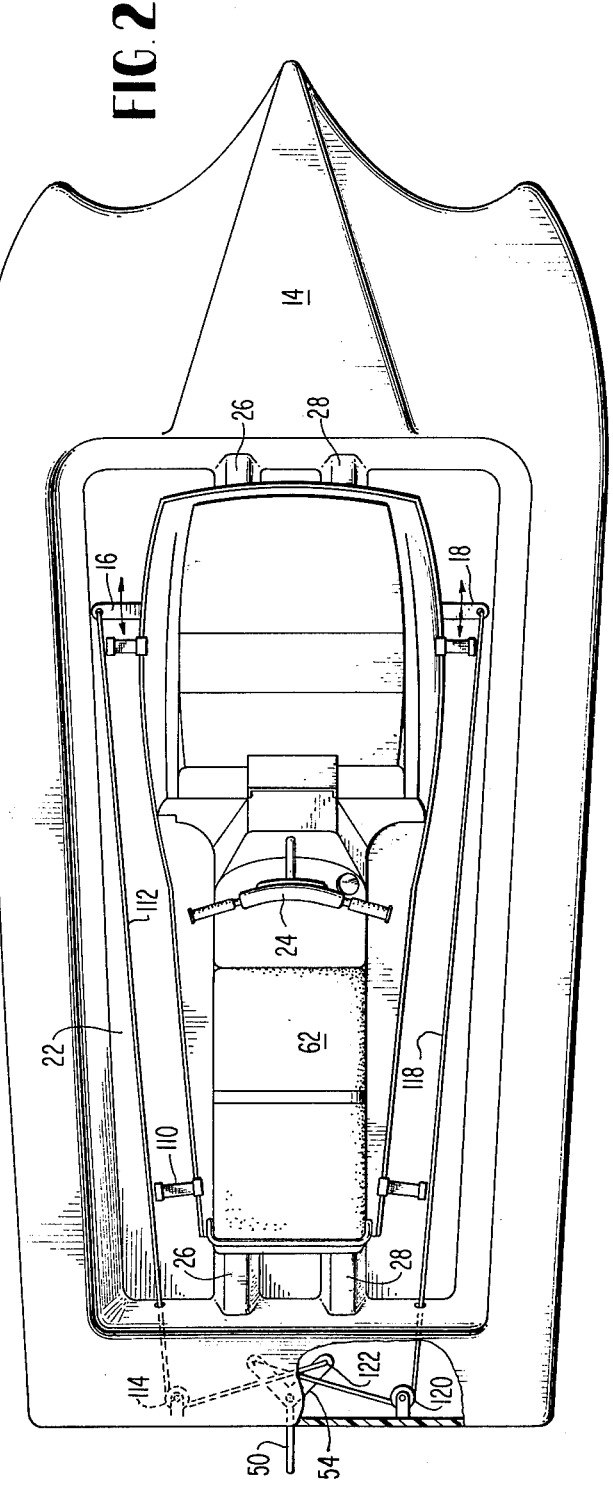

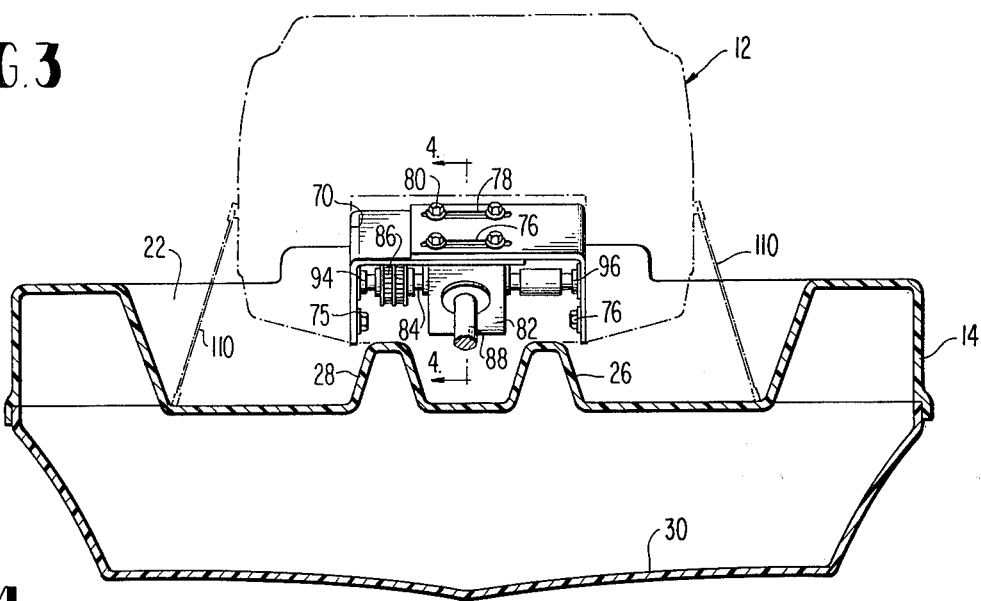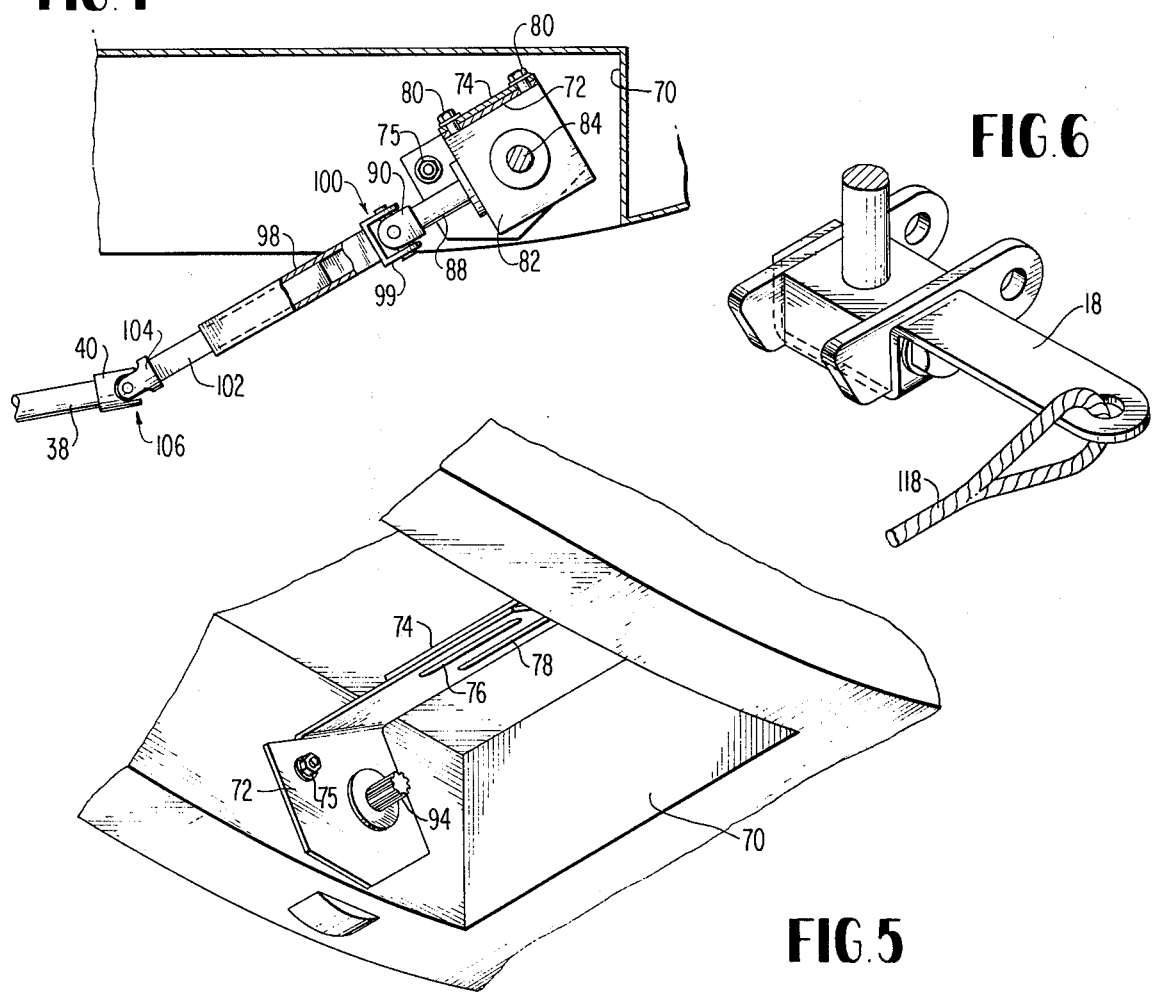

SELF-PROPELLED BOAT VEHICLE

BACKGROUND OF THE INVENTION

1. Field of the Invention

This invention relates to self-propelled vehicles for operation on the water and which can be readily converted to traverse snow-covered land surfaces. This vehicle is adapted to be converted to snowmobile use when not used as a water craft.

2. Description of the Prior Art

Self-propelled water vehicles which are adapted to be converted to snowmobiles are known and available to the public. U.S. Pat. No. 3,707,938 specifically refers to such a device. Nonetheless, the demand for new and improved water vehicles of this type continues to increase as people have increasingly more free time. The problem with prior art techniques is that the hulls adapted to such vehicles have been cumbersome and slow in the water. Another problem has been that the drive systems associated with prior art vehicles lack stability and are difficult to maintain, are relatively expensive and are not readily convertible to the different modes of operation. For these and other reasons, the following invention was perfected.

OBJECTIVE OF THE INVENTION

A principal objective of this invention is in the provision of a hull adapted to receive a snowmobile so that the combination comprises a new self-propelled water vehicle.

Another important objective of this invention is in the provision of an improved mounting for the drive assembly which facilitates the transfer of power from a snowmobile engine to that of a propeller shaft mounted in a water hull.

Another important objective of this invention is to provide an improved water hull which can be converted into a self-propelled water vehicle by mounting a powered snowmobile thereon.

A still further objective of this invention is to provide a steering conversion means wherein the steering mechanism which normally steers the ski members of the snowmobile operates the rudder assembly of the combination vehicle.

These and other objects of the invention will become more apparent to those skilled in the art by reference to the following detailed description when viewed in light of the accompanying drawings wherein:

DRAWINGS

FIG. 1 is a side elevational view with parts broken away;

FIG. 2 is a top plan view;

FIG. 3 is a vertical section taken on line 3—of FIG. 1;

FIG. 4 is a vertical section taken on line 4—4 of FIG. 3;

FIG. 5 is a perspective view of part of the underside of the snowmobile showing the drive shaft and gear box mounting bracket inside the track cavity; and FIG. 6 is a perspective view of the steering bracket to the ski mounting.

DETAILED DESCRIPTION

Referring now to the drawings wherein like numerals indicate like parts, the numeral 10 refers generally to the combination of a snowmobile 12 and a water-tight hull 14.

As shown in the drawings, the skis of snowmobile 12 have been removed from their mounting brackets 16 and 18 and its drive assembly 20 (hereinafter more fully described) has been disconnected from the driving tread of the snowmobile. The driving tread and its suspension assembly has also been removed from the snowmobile 12.

The water hull is formed of Fiberglas or the like and, in the embodiment shown, is formed with a depression 22 in its upper surface sufficiently large to accommodate the snowmobile 12. Running lengthwise of depression 22 along the bottom wall 24, the hull is formed with spaced rails 26 and 28 upon which the hull 22 can rest.

Approximately midway of the longitudinal length of depression 22, the bottom wall 30 of hull 14 is formed with a cross-width brace 32 having an opening 34 which receives a bearing 36 therein. This thrust bearing 36 rotatably supports a propeller shaft 38. The forward end of shaft 38 is formed with a yoke member 40 and its rearward end supports a driving propeller 42. The bottom surface 30 is formed with an opening 44 through which propeller shaft 38 extends. A leakage through this opening 44 is prevented by stuffing box 46.

At its rearward end, the hull 14 is equipped with a rudder 50 having an upwardly extending shaft 52 to which a rudder quadrant 54 is affixed at its upper end. The snowmobile 12 has a forwardly disposed hood 60 under which an engine is mounted. The snowmobile has a passenger seat 62 and a steering gear 64. The steering gear is connected through a linkage (not shown) to the ski brackets 16 and 18 by conventional steering mechanisms. As seen in FIG. 2, when steering handle 24 is turned counterclockwise, lug 16 will move rearwardly with a concurrent motion forwardly of bracket 18. When converted for water vehicle use, the steering means for connection to rudder 50 is described more in detail hereinafter.

As seen best in FIGS. 3, 4 and 5, the snowmobile is formed with a tread cavity 70 in its bottom surface. At its forward end, the tread cavity is equipped with a pair of L-shaped brackets 72 and 74 affixed securely to the side walls of the cavity by bolt means 75 and 76. The brackets 72 and 74 at their overlapping legs have a pair of overlapping slots 76 and 78 through which bolt members 80 are received. Bolt members 80 support a gear box 82. The gear box 82 thus has a sideway adjustability prior to the tightening of the bolts 80. The gear box receives a shaft 84 receiving power from the snowmobile engine via a chain drive 86. The gear box 82 has an output shaft 88 which is formed at its outer end with a yoke 90. Splined stub shafts 94 and 96 extend inwardly, respectively, from brackets 72 and 74 and support the outer ends of shaft 84 therebetween via matching splined connections. With this type of connection, the bolts 80 can be loosened and gear box 82 adjusted transverse of snowmobile 12 so that an easy connection can be made with the aforementioned propeller shaft 38. This adjustability, of course, is also readily usable when the snowmobile is reconverted to a land vehicle when it is necessary to reconnect the previously removed tread assembly.

A square hollow shaft 98 is formed with a yoke 99 forming a universal joint 100 with the yoke 90. Slidably received within shaft 98 is a squareshaped shaft 102 formed with a yoke 104 at its outer end forming a universal joint 106 with yoke 40 of propeller shaft 38. Conventional connection pins are utilized to form the universal joints.

As previously mentioned, when it is desired to use the snowmobile 12 with the water hull 14, the ski and tread assemblies of the snowmobile are removed. The driving assembly 20 is then connected to the propeller shaft 40. The snowmobile is positioned as shown in FIGS. 1 and 2 and the power train is connected to the propeller shaft. As can readily be seen, this is greatly facilitated by the fact that gear box 82 is movable laterally and the power train 20 is adjustable longitudinally. Once the proper connection is made, the bolts 80 are tightened. Once positioned, the snowmobile 12 is further secured by conventional means such as straps 110.

The steering mechanism is best seen in FIG. 2. A cable 112 connected to rudder 16 extends about the pulley 114 and is connected to the outer leg of the quadrant 54 at point 116. A cable 118 is connected to bracket 18, extends about the pulley 120 and is connected to the other leg of quadrant 54 at point 122. The cables are crossed so as to give the same steering direction given by the steering assembly when the unit 12 is used as a snowmobile.

In a general manner, while there have been disclosed effective and efficient embodiments of the invention, it should be well understood that the invention is not limited to such embodiments, as there might be changes made in the arrangement, disposition, and form of the parts without departing from the principles of the present invention as comprehended within the scope of the accompanying claims.

I claim:

1. An improvement in a water craft of the self-propelled type comprising in combination
a water-tight hull having a support surface formed in the upper surface thereof and having an opening formed in said hull,
a snowmobile having a power unit received by said support surface,
securing mechanisms for firmly securing said snowmobile to said hull,
said power unit having a power output shaft,
a propeller drive shaft extending through said opening and having a first interior end and an exterior end carrying a propeller,
sealing means disposed between said opening and said shaft, and
connecting means joining said first end of said propeller shaft to said power output shaft, said connecting means including an elongated member having a plurality of universal joints intermediate its ends.

2. The improvement of claim 1 wherein said elongated member has an adjustable length.

3. The improvement of claim 1 wherein a crossbrace extends across said support surface and said brace has an opening receiving said first end of said propeller shaft.

4. The improvement of claim 2 wherein said connecting means includes a pair of shafts telescopically received for length adjustability intermediate said universal joints.

5. The improvement of claim 1 wherein said connecting means includes a first shaft driven by said power unit, a gear box receiving said first shaft and said power output shaft, and a bracket supporting said gear box for lateral adjustability with respect to said hull.

* * * * *